United States Patent
Morikawa et al.

(10) Patent No.: US 10,354,447 B2
(45) Date of Patent: Jul. 16, 2019

(54) IMAGE PROCESSING DEVICE, IMAGE PROCESSING METHOD, AND IMAGE PROCESSING PROGRAM

(71) Applicant: TOPCON CORPORATION, Itabashi-ku, Tokyo (JP)

(72) Inventors: Naoki Morikawa, Tokyo (JP); Tadayuki Ito, Tokyo (JP)

(73) Assignee: TOPCON CORPORATION, Itabashi-ku, Tokyo (JP)

(*) Notice: Subject to any disclaimer, the term of this patent is extended or adjusted under 35 U.S.C. 154(b) by 0 days.

(21) Appl. No.: 15/704,215

(22) Filed: Sep. 14, 2017

(65) Prior Publication Data

US 2018/0082472 A1 Mar. 22, 2018

(30) Foreign Application Priority Data

Sep. 16, 2016 (JP) ................................. 2016-181696

(51) Int. Cl.
| | |
|---|---|
| *G06T 15/00* | (2011.01) |
| *G06T 19/00* | (2011.01) |
| *G06T 19/20* | (2011.01) |
| *G06T 7/285* | (2017.01) |

(52) U.S. Cl.
CPC ............ *G06T 19/003* (2013.01); *G06T 7/285* (2017.01); *G06T 15/005* (2013.01); *G06T 19/20* (2013.01); *G06T 2207/10012* (2013.01)

(58) Field of Classification Search
None
See application file for complete search history.

(56) References Cited

U.S. PATENT DOCUMENTS

| | | | |
|---|---|---|---|
| 2006/0116838 A1* | 6/2006 | Chang ..................... | G06T 19/00 702/98 |
| 2012/0256916 A1 | 10/2012 | Kitamura et al. | |
| 2016/0232259 A1* | 8/2016 | Williams ................ | G06F 17/50 |

FOREIGN PATENT DOCUMENTS

| | | |
|---|---|---|
| JP | 2012-230594 A | 11/2012 |
| WO | 2011070927 A1 | 6/2011 |

OTHER PUBLICATIONS

"James Thomas", "Clipping and Slicing a Point Cloud", Apr. 18, 2016, MicroSurvey (Year: 2016).*
Yue Li and Matthew Hielsberg, "A Tutorial for 3D Point Cloud Editor". Apr. 9, 2010, Texas A&M University (Year: 2010).*

* cited by examiner

*Primary Examiner* — YuJang Tswei
(74) *Attorney, Agent, or Firm* — Chiesa Shahinian & Giantomasi PC (57) ABSTRACT

A technique for facilitating understanding of a stereoscopic structure of an object in a 3-D image of point cloud data is provided. An image processing device includes a point cloud data display controlling unit, a marker display controlling unit, and a specified point cloud display controlling unit. The point cloud data display controlling unit displays a 3-D image of point cloud data on a screen. The marker display controlling unit displays a marker to specify a cut section of the 3-D image of the point cloud data. The specified point cloud display controlling unit displays a point cloud that constitutes the cut section among the point cloud data, as another image.

4 Claims, 10 Drawing Sheets

IMAGE PROCESSING DEVICE, IMAGE PROCESSING METHOD, AND IMAGE PROCESSING PROGRAM

CROSS-REFERENCE TO RELATED APPLICATION

This application is based upon and claims the benefit of priority from Japanese Patent Application No. 2016-181696 filed Sep. 16, 2016, the entire contents of which are incorporated herein by reference.

BACKGROUND OF THE INVENTION

Technical Field

The present invention relates to an image processing technique for point cloud data.

Background Art

Point cloud data that are obtained by using a laser scanner or by stereophotogrammetry are publicly known (for example, refer to WO 2011/070927 and Japanese Unexamined Patent Application Laid-Open No. 2012-230594).

Point cloud data of an object can generate a 3-D image of the object when three-dimensionally displayed on a screen of a PC or other device. The point cloud data is typically used for generating a three-dimensional model therefrom. The three-dimensional model is data showing an outline of an object and has a high affinity with three-dimensional data that can be processed by CAD software.

When point cloud data is displayed before it is processed, a 3-D image of an object is displayed by a set of dots. However, since the point cloud data is raw data that is not a three-dimensional model data, the outline of the object can be indistinct, and it would be difficult to instantly recognize which part is a periphery or an edge of the object (for example, a building). The 3-D image of the point cloud may be modified, for example, by changing the colors of the dots in accordance with difference in directions of planes, to enable easy understanding of its stereoscopic structure. However, this 3-D image of the point cloud can still cause the above problem. In the case of using raw data that is not processed, the above problem tends to occur.

Figure 2A:
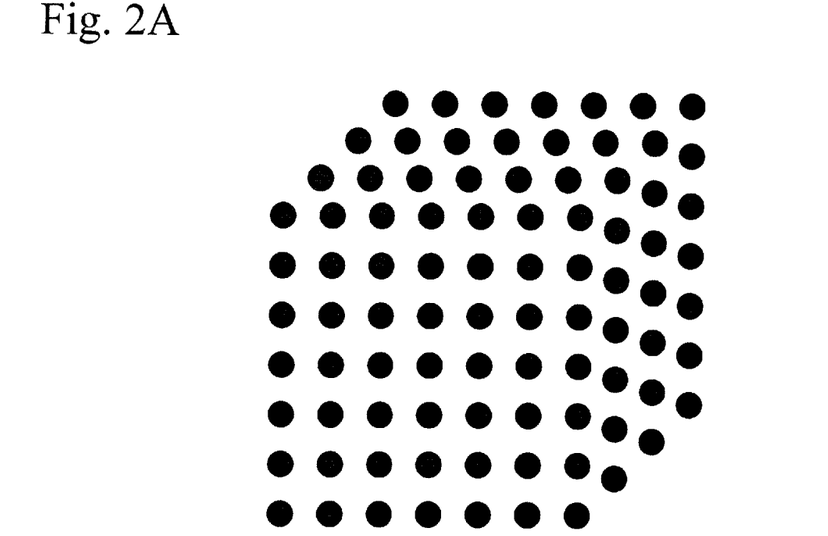
FIGS. 2A and 2B are conceptual diagrams each showing an example of point cloud data that is displayed on a screen.

A specific example will be described. FIG. 2A is a perspective view of an example of a 3-D image of point cloud data of a cubic object. As shown in FIG. 2A, when the image is displayed by simple dots, the perspective is difficult to recognize, and it is difficult to distinguish which part is a periphery of the cubic object.

Figure 2B:
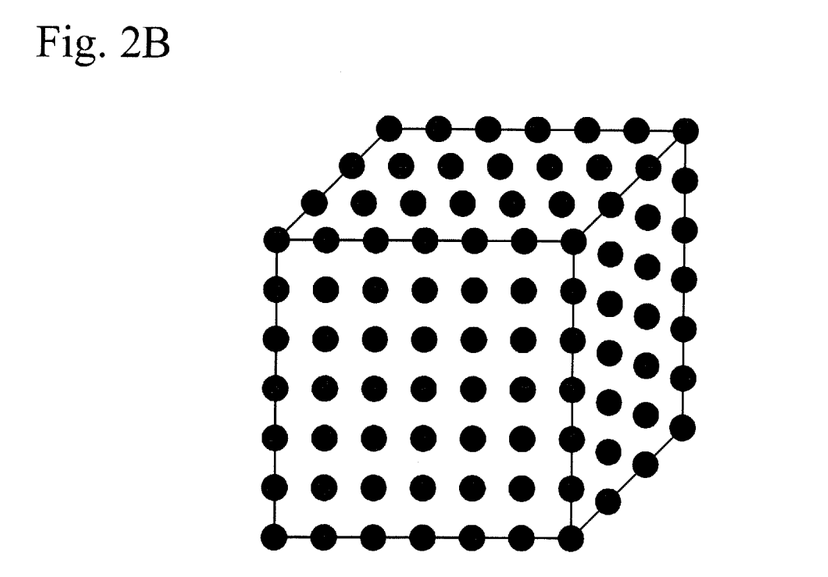

FIG. 2B shows an example of an image of point cloud data that is superimposed with peripheries of a cubic object. The peripheries of the cubic object are extracted from a three-dimensional model data of the point cloud data. In this case, the perspective is easily recognized. The image shown in FIG. 2B is obtained after the point cloud data is processed into the three-dimensional model data. That is, the image shown in FIG. 2B cannot be displayed by using the point cloud data before the point cloud data is processed into the three-dimensional model data.

SUMMARY OF THE INVENTION

In view of these circumstances, an object of the present invention is to provide a technique for facilitating understanding of a stereoscopic structure of an object in a 3-D image of point cloud data.

A first aspect of the present invention provides an image processing device including a first point cloud data display controlling unit, a marker display controlling unit, and a second point cloud data display controlling unit. The first point cloud data display controlling unit displays a 3-D image of point cloud data on a screen. The marker display controlling unit displays a marker to specify a cut section of the 3-D image of the point cloud data. The second point cloud data display controlling unit displays a point cloud that constitutes the cut section among the point cloud data, as another image.

According to a second aspect of the present invention, in the first aspect of the present invention, the displayed marker may be movable in a direction perpendicular to the cut section to cut another section, and a point cloud constituting the another cut section may be extracted from among the point cloud data.

According to a third aspect of the present invention, in the first or the second aspect of the present invention, a point cloud in a predetermined area in the direction perpendicular to the cut section may be extracted as the point cloud constituting the cut section.

According to a fourth aspect of the present invention, in any one of the first to the third aspects of the present invention, an image of the point cloud data that constitutes the cut section may be colored differently from an image of the rest of the point cloud data.

According to a fifth aspect of the present invention, in any one of the first to the fourth aspects of the present invention, the marker may indicate a range of the cut section, and one or both of the position and the size of the marker may be changeable.

According to a sixth aspect of the present invention, in any one of the first to the fifth aspects of the present invention, the direction of the cut section may be set so as to align with the direction of a plane of the 3-D image of the point cloud data.

A seventh aspect of the present invention provides an image processing method including displaying a 3-D image of point cloud data on a screen, displaying a marker to specify a cut section of the 3-D image of the point cloud data, and displaying a point cloud that constitutes the cut section among the point cloud data, as another image.

An eighth aspect of the present invention provides a non-transitory computer recording medium storing computer executable instructions that, when executed by a computer processor, cause the computer processor to display a 3-D image of point cloud data on a screen, display a marker to specify a cut section of the 3-D image of the point cloud data, and display a point cloud that constitutes the cut section among the point cloud data, as another image.

The present invention provides a technique for facilitating understanding of a stereoscopic structure of an object in a 3-D image of point cloud data.

PREFERRED EMBODIMENTS OF THE INVENTION

Figure 1:
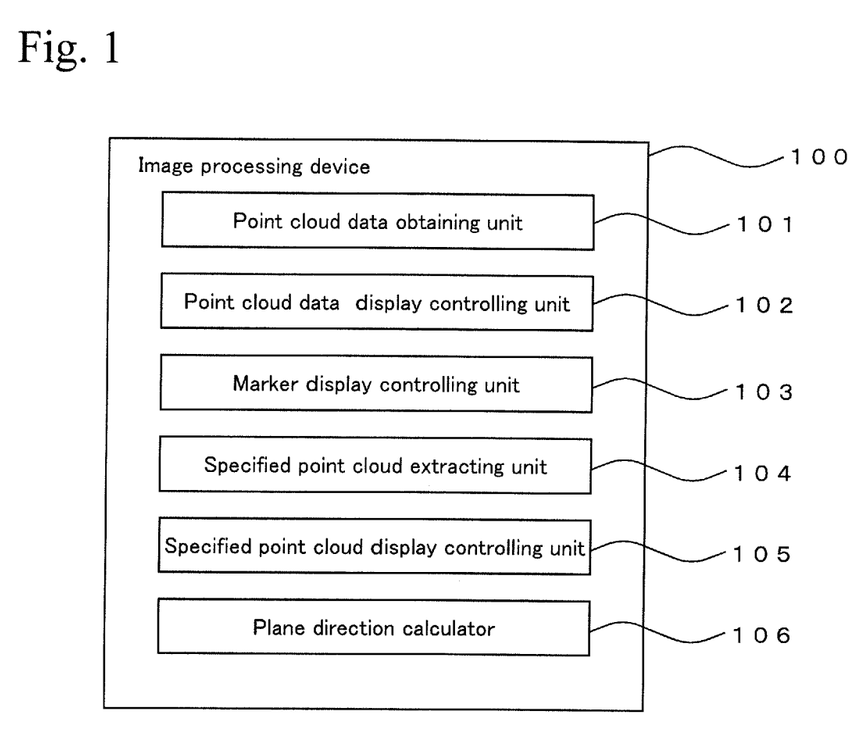
FIG. 1 is a block diagram of an embodiment.

FIG. 1 shows an image processing device 100 that is configured to process point cloud data. Typically, the image processing device 100 is constructed not by dedicated hardware but by application software using a personal computer (PC). The application software may be installed in the PC and is operated to execute the function of the image processing device 100.

When a PC is used, each functional unit shown in FIG. 1 is constructed by software. Each of the functional units shown in FIG. 1 may be composed of a dedicated arithmetic circuit. A functioning unit constructed of software and a functioning unit composed of a dedicated arithmetic circuit may be used together. For example, each of the functional units shown in the drawing may be constructed of an electronic circuit such as a central processing unit (CPU), an application specific integrated circuit (ASIC), or a programmable logic device (PLD) such as a field programmable gate array (FPGA).

Whether each of the functional units is to be constructed of dedicated hardware or is to be constructed of software so that programs are executed by a CPU is selected in consideration of necessary operating speed, cost, amount of electricity consumed, and other factors. For example, if a specific functional unit is composed of an FPGA, the operating speed is superior, but the production cost is high. On the other hand, if a specific functional unit is configured so that programs are executed by a CPU, the production cost is reduced because hardware resources are conserved. However, when the functional unit is constructed using a CPU, its operating speed is inferior to that of dedicated hardware. Constructing the functional unit by dedicated hardware and constructing the functional unit by software differ from each other, as described above, but are equivalent to each other from the viewpoint of obtaining a specific function.

The image processing device 100 includes a point cloud data obtaining unit 101, a point cloud data display controlling unit 102, a marker display controlling unit 103, a specified point cloud extracting unit 104, and a specified point cloud display controlling unit 105. The point cloud data obtaining unit 101 obtains point cloud data that is measured by a three-dimensional laser scanner, therefrom, through an appropriate communication means. The point cloud data may also be obtained by a method of calculating three-dimensional coordinates of numerous feature points that are extracted from photographed images, based on the principle of stereophotogrammetry.

The point cloud data display controlling unit 102 displays the point cloud data on an appropriate image displaying unit, such as a screen of a PC. The point cloud data may be displayed by dots as they are or by changing the colors of the dots, or may be displayed after being subjected to various kinds of image processing, such as removal of noise components.

Figure 3:
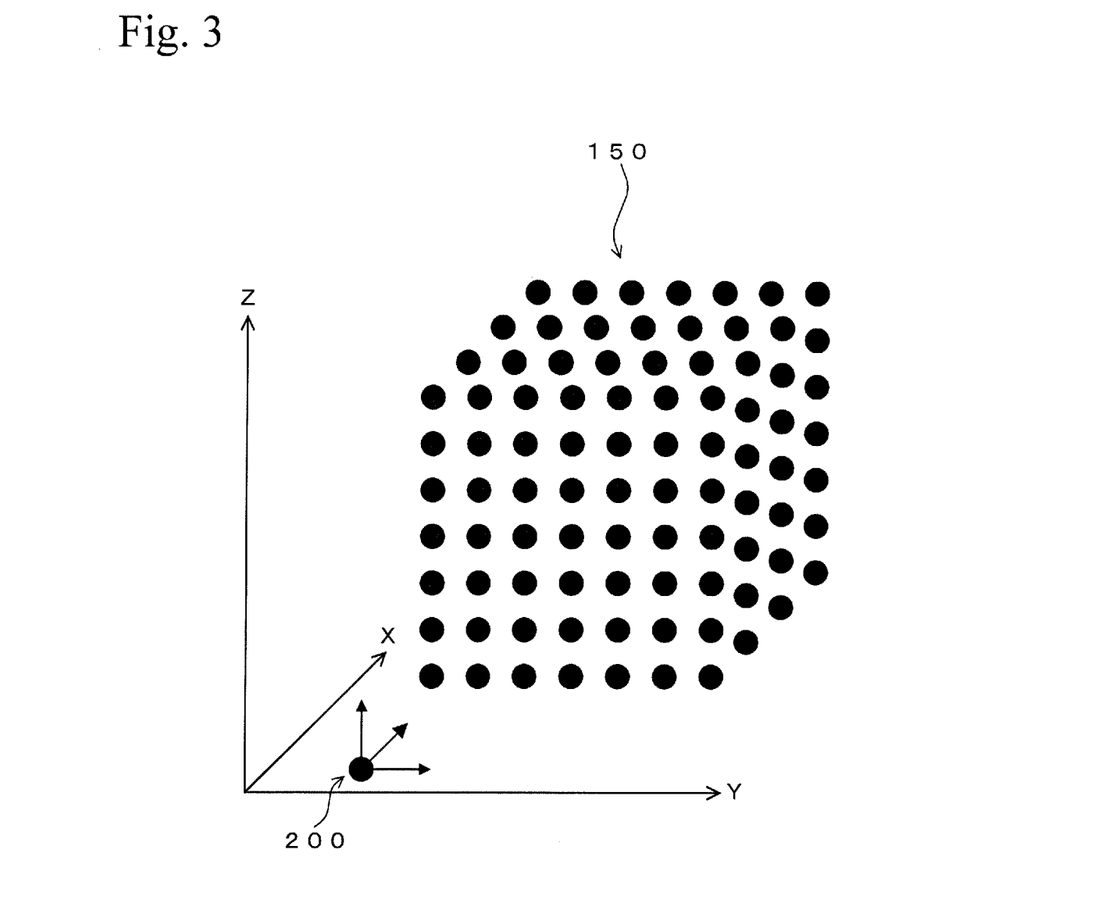
FIG. 3 is a conceptual diagram showing an example of point cloud data that is displayed on a screen.

The marker display controlling unit 103 controls display of a marker to cut a 3-D image of the point cloud data at a freely selected flat plane. FIG. 3 shows point cloud data 150 of a cubic object, which represents a building, and shows a marker 200 as an example of the displayed marker.

The marker 200 is movable in an X direction or a specific horizontal direction by operation of an operator, which may be performed by using a mouse. The marker 200 is moved to specify a position (position on the X axis) in the 3-D image of the point cloud data to be cut along a Y-Z plane. Here, the Z direction is a vertical direction, and the Y direction is a horizontal direction orthogonally crossing the X direction.

The azimuths shown in FIG. 3 may be set such that the X direction is set in the north-south direction (or the east-west direction), the Y direction is set in the east-west direction (or the north-south direction), and the Z direction is set in the vertical direction. This setting facilitates understanding of a relationship between a cut section and the azimuths. In another case, when the point cloud data 150 represents a building, the directions of the X axis, Y axis, and Z axis may be set in accordance with extending directions of walls of the building. FIG. 3 shows an example of this case.

Figure 4A:
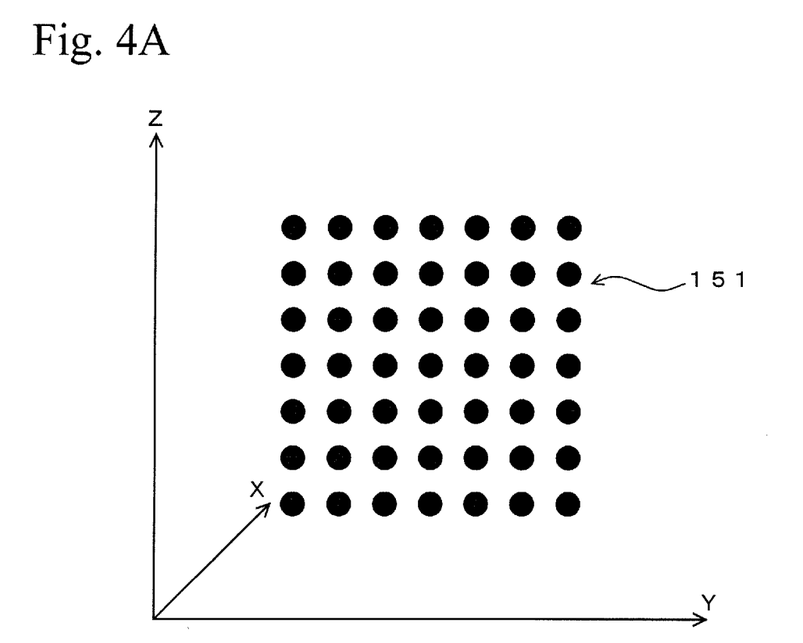
FIGS. 4A and 4B are conceptual diagrams each showing an example of point cloud data that is displayed on a screen.
Figure 4B:
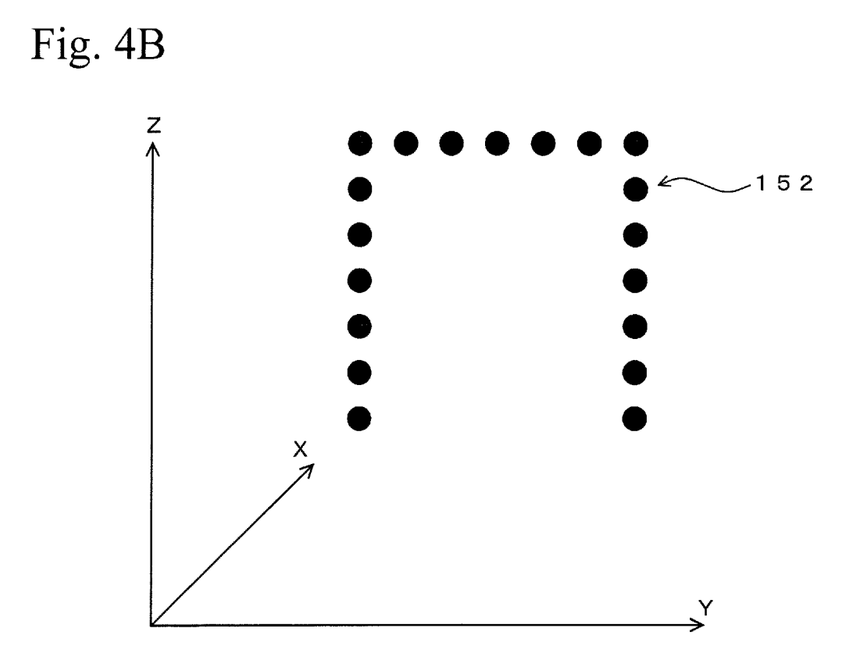

FIGS. 4A and 4B each show an example of a sub-image that is displayed separately from the image shown in FIG. 3 on the same screen at the same time. The sub-image may be displayed on a screen that is different from the screen showing a main image or may be displayed on the same screen by switching from the main image. When the marker 200 shown in FIG. 3 is moved on the X axis until the Y-Z plane containing the marker 200 overlaps the point cloud data 150, the overlapped part (point cloud data to be cut along the Y-Z plane) is displayed as shown in FIG. 4A or 4B. FIG. 4A shows point cloud data 151 of a plane shape that is obtained by cutting a periphery on the X axis of the point cloud data 150 of the cubic object shown in FIG. 3 along the Y-Z plane. In this case, a front end plane on the X axis of the point cloud data 150 is cut along the Y-Z plane, and the cut part of the plane is displayed.

When the marker 200 shown in FIG. 3 is moved further in the X axis positive direction from the condition shown in FIG. 4A, the position of a plane in the point cloud data 150 to be cut along the Y-Z plane is changed. This case is exemplified in FIG. 4B. In this case, since point clouds for an inside of the cubic object, which is the base for the point cloud data 150, are not obtained, a frame-shaped point cloud is obtained as a point cloud of the cut plane.

The processing step of cutting the 3-D image of the point cloud data 150 shown in FIG. 3 along the Y-Z plane and extracting the point cloud data 151 and 152 as shown in FIGS. 4A and 4B is performed as described below. First, three-dimensional coordinates of each point constituting the point cloud data 150 is preliminarily obtained. Coordinates of the Y-Z plane that is specified by using the marker 200 are determined from a plane equation in a coordinate system that describes the point cloud data 150. Thus, a point cloud crossing or in proximity to the Y-Z plane, which is specified by using the marker 200, is extracted from among the point cloud data 150. To be more precise, since the point clouds are discretely distributed, threshold values are set, and the points in proximity to the Y-Z plane are extracted in an area within the threshold values.

As shown in FIGS. 4A and 4B, the 3-D image of the point cloud data is cut by using the marker 200. The point cloud constituting the cut section is displayed as another image separately from the 3-D image. This facilitates understanding of the stereoscopic structure of the point cloud data. For example, while the marker 200 is moved in the X axis direction, peripheries of the point cloud data 150, which are respectively cut along the Y-Z plane, are successively displayed. Tracing the display history facilitates understanding of the stereoscopic shape (peripheries) of the object, which is the base for the point cloud data 150.

The moving direction of the marker 200 is set by an operator as desired. In another case, for example, the marker 200 may be moved automatically, and point clouds constituting cut sections, which are successively obtained, may be displayed by thumbnail images aligning on a time axis. Such a UI display also facilitates understanding of the stereoscopically distributed condition of the point cloud data.

In the above cases, the Y-Z plane to be used for the cutting has a thin thickness, but it may have a large thickness. In such case, a point cloud that is distributed also in the X axis direction is extracted.

The specified point cloud extracting unit 104 extracts the point cloud data of a cut section that is cut along a specified plane of the 3-D image of the point cloud data. For example, the specified point cloud extracting unit 104 cuts the 3-D image of the point cloud data 150, as shown in FIG. 3, and extracts the point cloud data 151 and 152, as shown in FIG. 4, from the point cloud data 150.

The specified point cloud display controlling unit 105 controls display of the point cloud data that is extracted by the specified point cloud extracting unit 104. For example, the specified point cloud display controlling unit 105 controls display of the image as shown in FIG. 4.

As described above, the image processing device 100 includes the point cloud data display controlling unit 102, the marker display controlling unit 103, and the specified point cloud display controlling unit 105. The point cloud data display controlling unit 102 displays a 3-D image of point cloud data. The marker display controlling unit 103 displays the marker to specify a cut section of the 3-D image of the point cloud data. The specified point cloud display controlling unit 105 displays a point cloud that constitutes the cut section among the point cloud data, as another image.

This structure is configured to extract a periphery of an object and displays the periphery, thereby facilitating understanding of the stereoscopically distributed condition of the point cloud data. For example, in a case of using point cloud data based on a building, a stereoscopic shape of the building is easily understood without generating a three-dimensional model.

Figure 5:
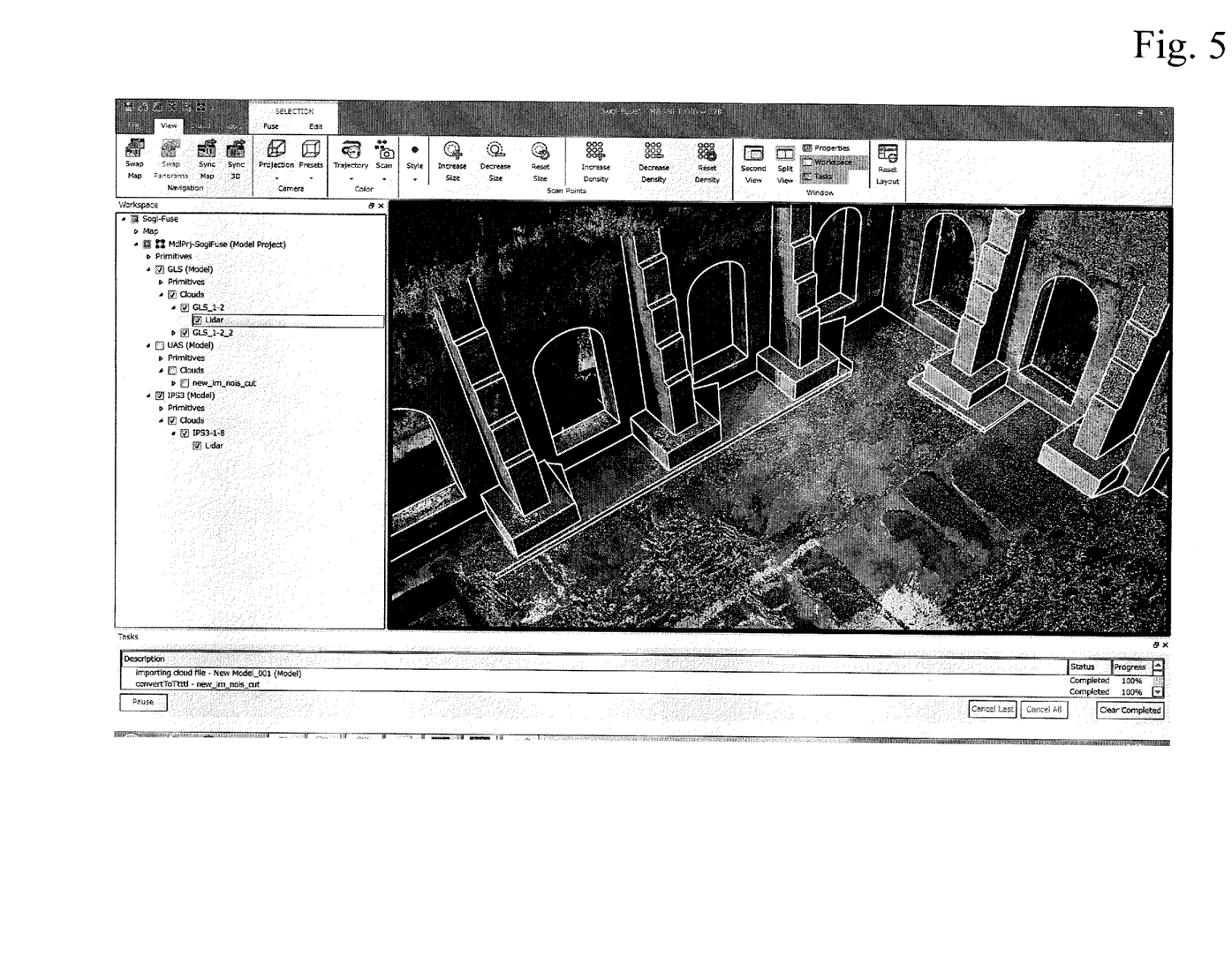
FIG. 5 shows a 3-D image of point cloud data that is processed.

FIG. 5 shows a displayed 3-D image of point cloud data of an object after the point cloud data is processed. Although FIG. 5 shows a gray scale image, this image can be an easily understandable point cloud image in which each point is colored, in actual use. The coloring processing is performed by superimposing the point cloud data on a photographic image and coloring the points in areas corresponding to the areas in the photographic image. The photographic image is photographed by a camera at the same time when the point cloud data is obtained.

Figure 6:
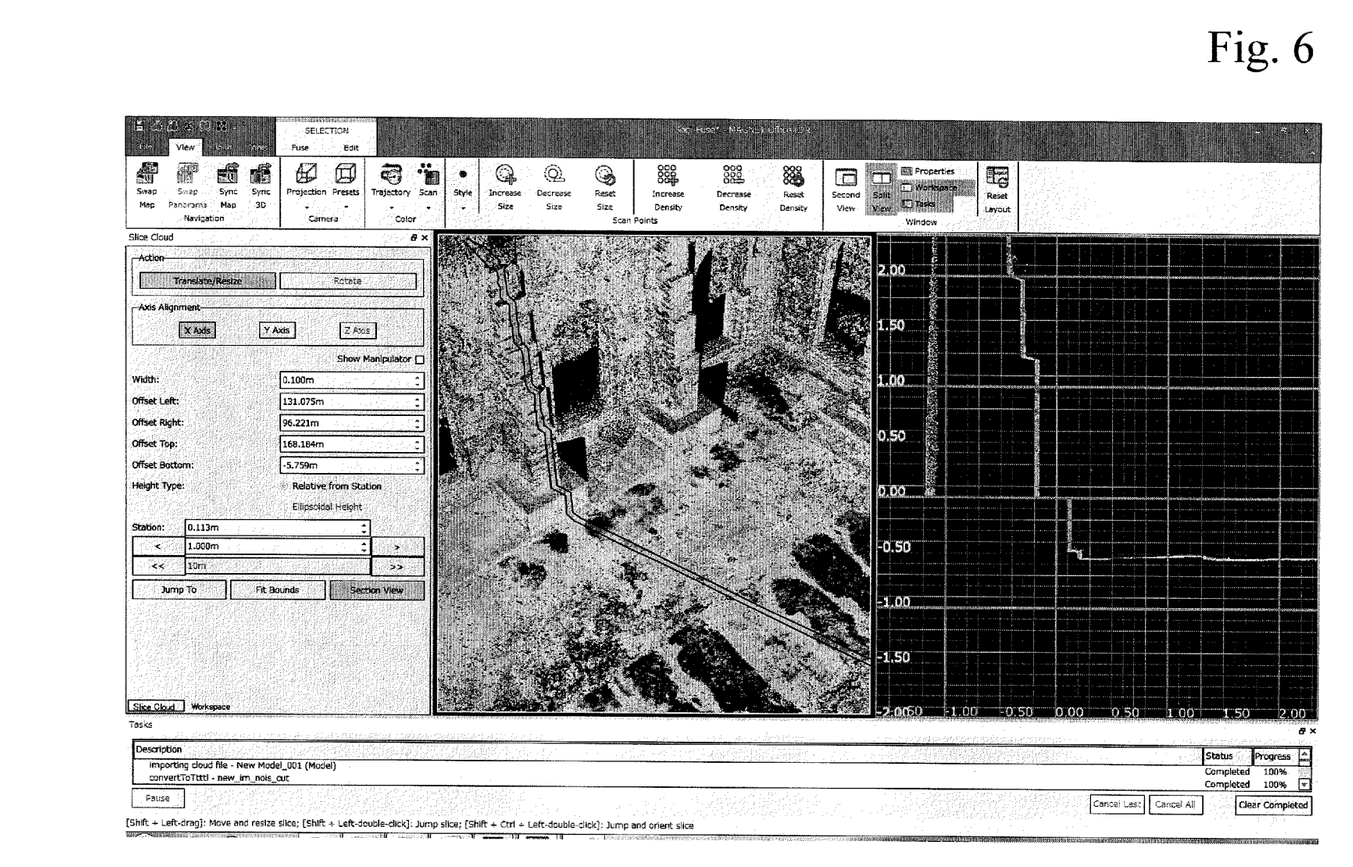
FIG. 6 shows the 3-D image (intensity image) of the point cloud data shown in FIG. 5 and a sectional image of a part of the 3-D image.

FIG. 6 shows a point cloud image that is displayed on the left side. This point cloud image is obtained by shading the point clouds of the point cloud data in FIG. 5, in accordance with intensities of reflection light. FIG. 6 shows an image of a point cloud, as seen from a direction perpendicular to a cut section, on the right side. This point cloud constitutes the cut section that is cut along a strip-shaped line shown in the left image. As shown in FIG. 6, a part of the 3-D image of the point cloud data is cut (refer to the left image), and the point cloud constituting the cut section is displayed as seen from the direction perpendicular to the cut section (refer to the right image). This facilitates recognizing of the outline of the object. The line for defining the cut section as shown in the point cloud image on the left side in FIG. 6 can have any width. The line may have a wide width to extract points in an area having a wide width in a direction perpendicular to the cut section.

Figure 7:
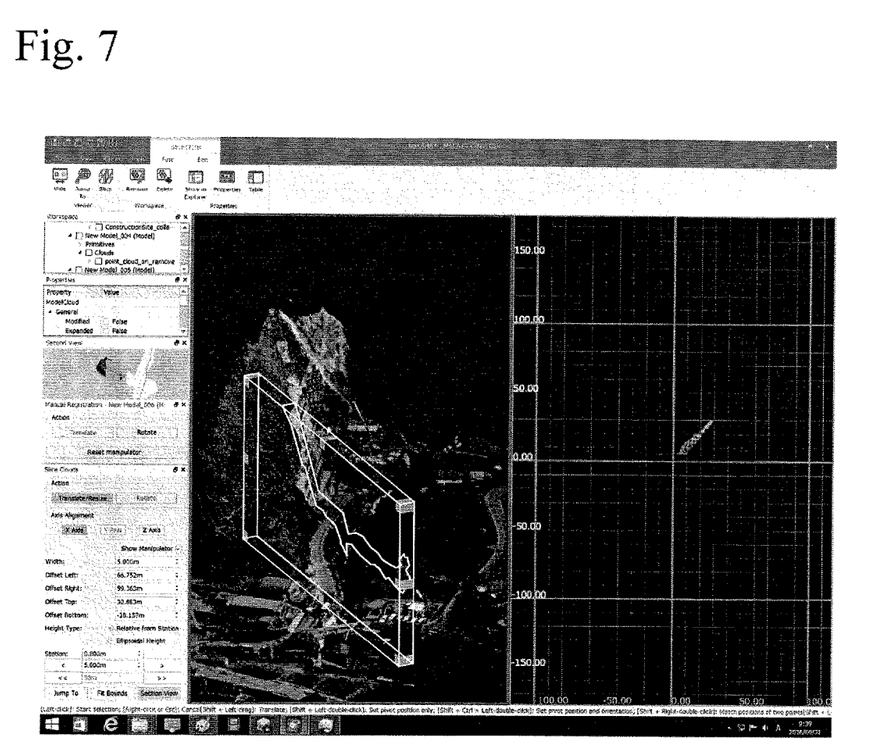
FIG. 7 shows a 3-D image of point cloud data.

A marker having a function different from the function of the marker 200 may also be displayed. This marker is a cut-area indication. The cut-area indication marker indicates an area of a part of the 3-D image of the point cloud data to be cut. The display of the cut-area indication marker is also controlled by the marker display controlling unit 103. FIG. 7 shows an example of displaying a cut-area indication marker on a displayed point cloud image. This marker has a small thickness and has a flat rectangular shape. Either one of the marker 200 or the cut-area indication marker may be displayed, or they may be displayed at the same time. The 3-D image shown in FIG. 7 is an easy-to-see point cloud image of which points are shaded. The shading processing is performed by superimposing the point cloud data on a photographic image and shading the points in areas corresponding to the areas in the photographic image. The photographic image is photographed by a camera at the same time when the point cloud data is obtained.

As shown in FIG. 7, the cut-area indication marker is displayed on the image showing the entirety of the point cloud data. This facilitates visual understanding of the part to be cut. The position and the size of the cut-area indication marker can be specified. For example, the cut-area indication marker as shown in FIG. 7 may be left-clicked and dragged by using a mouse to move its position. Additionally, the cut-area indication marker may be right-clicked and dragged by using a mouse to change its size. The size can be changed along respective three axis directions that orthogonally cross each other. These operations are also controlled by the marker display controlling unit 103.

Figure 8:
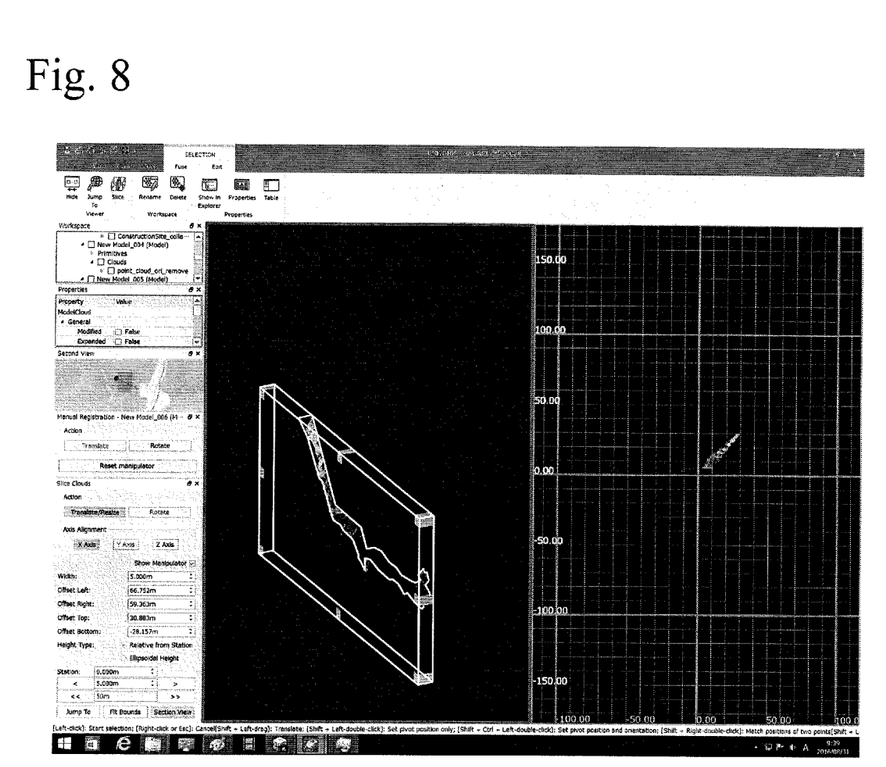
FIG. 8 shows a 3-D image of point cloud data.

FIG. 7 also shows an example of a displayed color image of the cut part. The entirety of the image is monochromatic, but the cut part is colored, thereby facilitating understanding of the stereoscopic structure of the cut part. FIG. 8 shows a screen showing only a part that is cut by the cut-area indication marker shown in FIG. 7.

The cut-area indication marker may be rotated. Since three-dimensional coordinates of each point of the point cloud data are preliminarily known, rotating the cut-area indication marker changes points to be cut and also changes the image of the cut part (for example, the image shown in FIG. 8).

Figure 11:
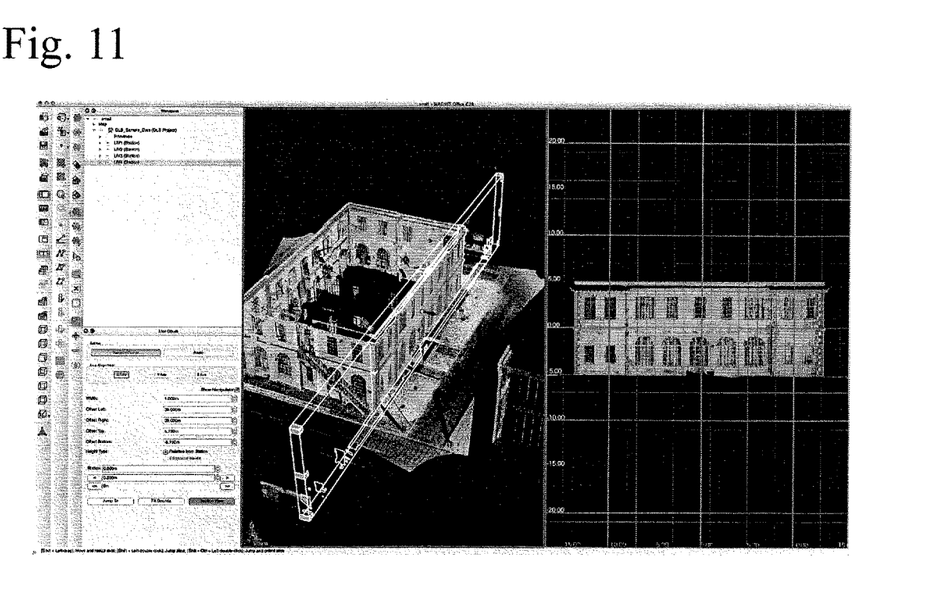
FIG. 11 shows a 3-D image of point cloud data.

The cut-area indication marker may be displayed so as to align with the direction of a plane of the object. An example of this case is shown in FIG. 11. In the case shown in FIG. 11, the cut-area indication marker is displayed by aligning the normal line of the plane of the cut-area indication marker with the normal line of a plane of the object. Point cloud data is mostly handled by targeting planes of an object. In such cases, the display of the cut-area indication marker aligning with a plane of an object is convenient.

The processing step for aligning the direction of the plane (direction of the normal line) of the cut-area indication marker with the direction of a plane (direction of the normal line) of an object is performed as described below. The aligning processing is performed by the plane direction calculator 106. In the aligning processing, first, a part of an object, on which the cut-area indication marker aligning with the normal line of a plane of the object is to be displayed, is specified. In the case shown in FIG. 9, for example, a wall surface at the right side of the building is specified. This operation is performed by using a mouse, for example.

Next, points of the specified part are obtained, and moreover, multiple points around the obtained points (specified points) are obtained. For example, points in a quadrangular area of 15×15 points centering at each specified point are obtained. The area of the points to be obtained and the method of obtaining the points can be freely set. For example, instead of successive points, points at every five points or every ten points may be obtained.

Then, a plane equation that fits to point cloud composed of the specified points and the surrounding multiple points is derived. Then, a normal line of a calculated plane is calculated and obtained as a normal line of the plane of the specified part in the object. The direction of the cut-area indication marker is adjusted to align with the normal line of the plane of the specified part. Specifically, the direction of the cut-area indication marker is adjusted so that the normal line of the cut-area indication marker will align with the normal line of the specified part, which is calculated by the above method. The adjustment of the direction is performed by the marker display controlling unit 103. Consequently, a cut-area indication marker aligning with the direction of the plane of the object is displayed as shown in FIG. 11, for example.

Figure 9:
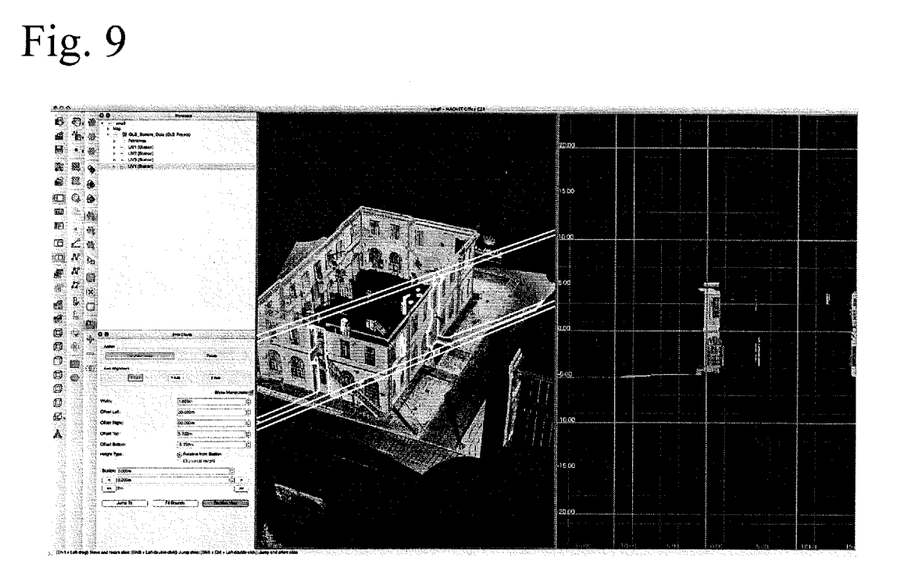
FIG. 9 shows a 3-D image of point cloud data.
Figure 10:
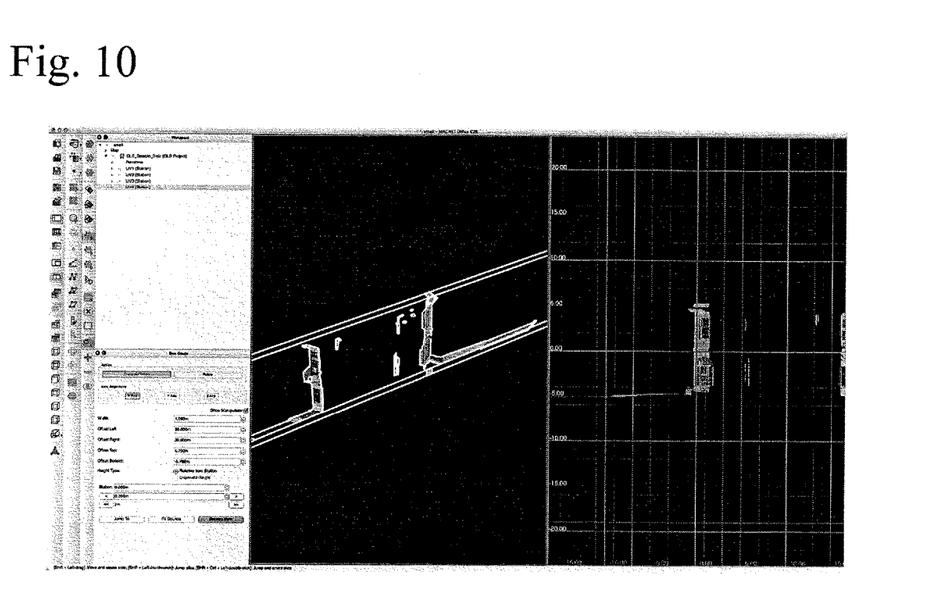
FIG. 10 shows a 3-D image of point cloud data.
Figure 12:
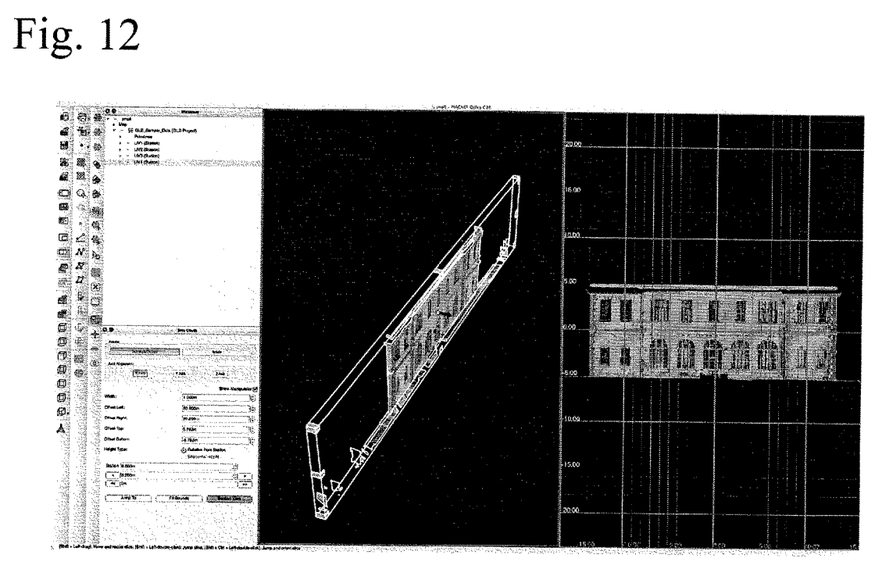
FIG. 12 shows a 3-D image of point cloud data.

For example, in the case shown in FIG. 9, the cut-area indication marker is displayed to obliquely cut the building and extract a point cloud constituting the obliquely cut plane. The displayed image that is formed only of this extracted point cloud is shown in FIG. 10, but this image is difficult to visually understand clearly. In contrast, setting the cut-area indication marker to align with the normal line of a plane of an object enables display of a point cloud image in which the object is easy to visually understand. This case is exemplified by the image on the right side in FIG. 11 and is also exemplified in FIG. 12, which is a displayed image that shows only the extracted point cloud.

What is claimed is:

1. An image processing device comprising a processor, the processor configured to:
   display points of point cloud data on a screen, the point cloud data having known three-dimensional coordinates in an XYZ coordinate system, and the displayed points forming a 3-D image;
   display a marker on the screen to specify a cut section of the 3-D image in response to designation of a position of the cut section by an operator;
   extract points of the point cloud data within a threshold range to the cut section in the XYZ coordinate system in response to specification of the cut section in the XYZ coordinate system by the displayed marker;
   display the extracted points on the screen;
   derive a plane equation relating to a plane constituting an object from which the point cloud data is obtained and calculate a normal line of the plane on a basis of the plane equation; and
   display a cut-area indication marker on the screen, the cut-area indication marker showing a flat part to be cut out from the point cloud data of the 3-D image,
   wherein a direction of a normal line of the flat part coincides with a direction of the normal line of the plane.

2. An image processing method comprising:
   displaying points of point cloud data on a screen, the point cloud data having known three-dimensional coordinates in an XYZ coordinate system, and the displayed points forming a 3-D image;
   displaying a marker on the screen to specify a cut section of the 3-D image in response to designation of a position of the cut section by an operator;
   extracting points of the point cloud data within a threshold range to the cut section in the XYZ coordinate system in response to specification of the cut section in the XYZ coordinate system by the displayed marker;
   displaying the extracted points on the screen;
   deriving a plane equation relating to a plane constituting an object from which the point cloud data is obtained and calculating a normal line of the plane on a basis of the plane equation; and
   displaying a cut-area indication marker on the screen, the cut-area indication marker showing a flat part to be cut out from the point cloud data of the 3-D image,
   wherein a direction of a normal line of the flat part coincides with a direction of the calculated normal line of the plane.

3. A non-transitory computer recording medium storing computer executable instructions that, when executed by a computer processor, cause the computer processor to:
   display points of point cloud data on a screen, the point cloud data having known three-dimensional coordinates in an XYZ coordinate system, and the displayed points forming a 3-D image;
   display a marker on the screen to specify a cut section of the 3-D image in response to designation of a position of the cut section by an operator;
   extract points of the point cloud data within a threshold range to the cut section in the XYZ coordinate system in response to specification of the cut section in the XYZ coordinate system by the displayed marker;
   display the extracted points on the screen;
   derive a plane equation relating to a plane constituting an object from which the point cloud data is obtained and calculate a normal line of the plane on a basis of the plane equation; and
   display a cut-area indication marker on the screen, the cut-area indication marker showing a flat part to be cut out from the point cloud data of the 3-D image,
   wherein a direction of a normal line of the flat part coincides with a direction of the calculated normal line of the plane.

4. An image processing device comprising a processor, the processor configured to:
   display points of point cloud data on a screen, the point cloud data having known three-dimensional coordinates in an XYZ coordinate system, and the displayed points forming a 3-D image;
   derive a plane equation relating to a plane constituting an object from which the point cloud data is obtained and calculate a normal line of the plane on a basis of the plane equation; and
   display a cut-area indication marker on the screen, the cut-area indication marker showing a flat part to be cut out from the point cloud data of the 3-D image,
   wherein a direction of a normal line of the flat part coincides with a direction of the normal line of the plane.

* * * * *